US005825925A

United States Patent [19]
Baird et al.

[11] Patent Number: 5,825,925
[45] Date of Patent: Oct. 20, 1998

[54] IMAGE CLASSIFIER UTILIZING CLASS DISTRIBUTION MAPS FOR CHARACTER RECOGNITION

[75] Inventors: Henry Spalding Baird, Maplewood; Tin Kam Ho, Scotch Plains, both of N.J.

[73] Assignee: Lucent Technologies Inc., Murray Hill, N.J.

[21] Appl. No.: 744,291

[22] Filed: Nov. 6, 1996

Related U.S. Application Data

[63] Continuation of Ser. No. 335,212, Nov. 4, 1994, abandoned, which is a continuation of Ser. No. 138,579, Oct. 15, 1993, abandoned.

[51] Int. Cl.$^6$ ..................................................... G06K 9/66
[52] U.S. Cl. .......................... 382/225; 382/159; 382/192; 382/203; 382/221
[58] Field of Search .................................... 382/225, 203, 382/222, 192, 221, 224, 228, 159, 160

[56] References Cited

U.S. PATENT DOCUMENTS

| | | | |
|---|---|---|---|
| 3,638,188 | 1/1972 | Pincoffs et al. | 382/14 |
| 3,651,459 | 3/1972 | Hahn | 382/231 |
| 3,930,231 | 12/1975 | Henrichon, Jr. et al. | 382/205 |
| 4,119,946 | 10/1978 | Taylor | 382/209 |
| 4,177,448 | 12/1979 | Brayton | 382/203 |
| 5,034,991 | 7/1991 | Hagimae et al. | 382/36 |
| 5,060,277 | 10/1991 | Bokser | 382/15 |
| 5,237,627 | 8/1993 | Johnson et al. | 382/25 |
| 5,255,354 | 10/1993 | Mahoney | 395/133 |
| 5,263,097 | 11/1993 | Katz et al. | 382/14 |

OTHER PUBLICATIONS

Baird, H. S., "Document Image Defect Models," in Baird, H. S., Bunke, H., and Yamamoto, K. (Eds), Structured Document Image Analysis, Springer–Verlag, New York, 1992, pp. 546–556.

Baird, H. S., "Calibration of Document Image Defect Models," *Proceedings, 2nd Annual Symposium on Document Analysis and Information Retrieval*, Ceasar's Palace Hotel, Las Vegas, Nevada, Apr. 26–28, 1993.

Bledsoe, W. W. and Browning, I., "Pattern Recognition and Reading by Machine," 1959 proceedings of the Eastern Joint Computer Conference, Copyright 1959 by Academic Press, Inc., pp. 174–181.

Baird, H. S., "Document Image Models and Their Uses," *Proceedings, IAPR 2nd Int'l Conf. on Document Analysis and Recognition (ICDAR '93)*, Tsukuba Science City, Japan, Oct. 20–22, 1993. (Available from IEEE Computer Society Press.)

Ho, T. K; Hull, J. J.; Srihari, S. N.; "On Multiple Classifier Systems for Pattern Recognition," *Proceedings of the 11th International Conference on Pattern Recognition*, The Hague, The Netherlands, Aug. 30–Sep. 3, 1992, pp. 84–87.

Kleinberg, E. M. and Ho, T. K. "Pattern Recognition by Stochastic Modeling," *Proceedings fo the Third International Workshop on Frontiers in Handwriting Recognition*, Buffalo, May 1993, 175–183.

*Primary Examiner*—Yon Couso
*Assistant Examiner*—Jon Chang
*Attorney, Agent, or Firm*—Martin I. Finston

[57] ABSTRACT

An image classifier, which performs character recognition, receives input images and assigns each input image to one of a plurality of image classes. The image classifier includes plural class distribution maps, each based on a plurality of features evaluated on training images, and each representing those feature values that occur at least once among the training images belonging to the corresponding class. The image classifier further includes means for constructing a test map by evaluating the plurality of features on the input image. The image classifier further includes means for comparing the test map to the class distribution maps in order to identify which one of the class distribution maps has the least distance to the test map. At least one of the features is defined according to a rule that relates to the shapes of images of at least one image class.

1 Claim, 5 Drawing Sheets

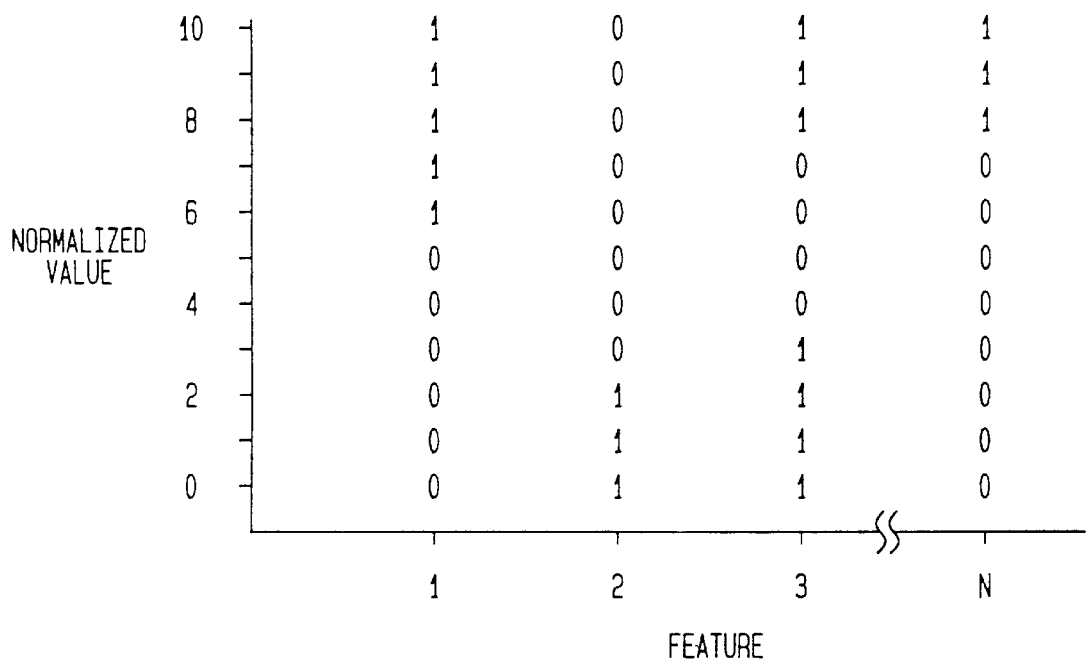

| SEGMENT | 1 | 2 | 3 | 4 |
|---|---|---|---|---|
| ● $S_1$ | 1 | 1 | 0 | 0 |
| ○ $S_2$ | 0 | 1 | 1 | 1 |

IMAGE CLASSIFIER UTILIZING CLASS DISTRIBUTION MAPS FOR CHARACTER RECOGNITION

This application is a continuation of application Ser. No. 08/335212, filed on Nov. 4, 1994, now abandoned, which is a continuation of application Ser. No. 08/138,579, filed on Oct. 15,1993, now abandoned.

FIELD OF THE INVENTION

The invention relates generally to the automatic interpretation of images and, more particularly, to the classification or recognition of images of machineprinted or hand-written symbols.

DESCRIPTION OF THE PRIOR ART

An important area of image interpretation is optical character recognition (OCR), in which images of symbols are automatically translated into binary codes representing the symbols. A major problem in optical character recognition is distinguishing similarly shaped symbols whose images are noisy; that is, images that suffer from degradation, distortion, or defects. These image defects may occur for many reasons, including variations of handwriting style, typeface, and size of text, as well as peculiarities of the spatial sampling rate, optical distortion, and other effects due to the physics of printing and imaging.

The complexity of these effects has, until recently, defied attempts to describe them quantitatively and exhaustively. Thus, the true class-conditional distributions of images cannot be predicted analytically in detail even given perfect knowledge of the ideal symbol shapes. In practice, these distributions have been accessible only empirically, in the form of finite data sets of images, gathered and labeled with ground truth at considerable expense. Such data sets, even when they number in the millions, are sparse compared to the variety of images that can occur in practice.

An automatically trainable method of the prior art will generally classify an unknown input image by comparing a set of features evaluated on the input image to a set or distribution of feature values associated with a given class. In this context, a feature is a function that returns a real number when it is applied to an image. The set or distribution of feature values associated with each of the image classes is constructed by applying the features to a training set; i.e., a set of images, each of which is labeled with its true class.

Features vary in complexity. For example, W. W. Bledsoe et al., "Pattern Recognition and Reading by Machine," 1959 *Proceedings of the Eastern Joint Computer Conference*, Academic Press (1959) 174–181, describes early work in which features were based on randomly chosen pairs of pixels. The possible numerical values of each pixel are the four binary values 00, 01, 10, 11, corresponding to the possible logical states of these pairs. This method was not accurate enough to use in a practical optical character reader.

Even very recent classification methods, using more complex features, often yield disappointingly low accuracy on isolated-character recognition problems. In such cases, it is seldom clear whether the inaccuracy is due to flaws in the classification methodology (e.g. poorly chosen features), or to poor quality of the training sets (e.g. too few samples), or to both. Given this uncertainty, and the expense of acquiring large and representative training sets, most OCR research in the last few decades has focused on heuristics for approximating the available sparse training sets, using a wide variety of methods for interpolation, smoothing, and analytic modeling of the feature distributions. In order to do this, many simplifying assumptions have necessarily been invoked concerning the forms of the distributions, e.g. that they are simply-connected, unimodal, convex, analytic, or parametric (e.g. multi-dimensional Gaussian).

However, many of the features that have proven effective have distributions that are quite complex, and only poorly modeled when these simplifying assumptions are made. As a result, these simplifying assumptions can introduce inaccuracies that reduce the dependability of image classifiers.

In an alternate strategy, sometimes referred to as the "nearest neighbor" strategy, only a few prototype images per class are stored, and a fixed global image metric $D(x,y) \geq 0$ (distance function between any two pair of images x and y) is used with the hope of generalizing from this sparse set to the true distribution. This approach is not entirely desirable, because there is no reason to believe that any single global distance function will correctly model the complexities of all class distributions.

Thus, practitioners in the field have hitherto failed to provide a practical image classification method that can combine strong features (i.e., features that, with high probability, will have substantially different values when evaluated on images selected from at least two different classes) with the accuracy that comes from realistic representation of the feature distributions.

SUMMARY OF THE INVENTION

According to the invention, we construct a family of class metrics $d_c(x) \geq 0$, one for each class c, each computing a distance from an unknown image x to the particular class c. Given a family of perfect (or nearly perfect) metrics, classification can be performed according to minimum distance: the class c for which $d_c(x)$ is minimum is returned as the preferred class for x.

We say that a class metric $d_c(x) \geq 0$ is perfect if, for every image x and every class c, $d_c(x)=0$ if and only if x is in class c. A perfect metric behaves as a kind of "ideal indicator function" for the class, zero within its distribution, and strictly positive outside of it. In practice, of course, such metrics are not invariably perfect; but they can come very close. Our classification method can be used with such perfect, or nearly perfect, metrics. As a result, our method can achieve high accuracy (at least as good as the best classical competing methods); excellent reject behavior that outperforms some popular competing methods; and fast convergence during training, permitting on-the-fly retraining and automatic specialization.

In accordance with the invention, we construct, for each class, a detailed but space-efficient representation of the empirical class-conditional distribution of values of features, which we call a distribution map. In an illustrative distribution map, each value of each feature may be represented by a bit which is set to 1 if and only if that feature's value occurs in the training data for that class.

In use, an image classifier according to the invention compares a test map, based on features evaluated on an input image, to plural class distribution maps based on a set of training images. The input image is assigned to the class of that class distribution map having the smallest distance to the test map. In one illustrative embodiment, the distribution map having the smallest distance to the test map is that distribution map that includes the greatest number of feature values in common with the test map.

Accordingly, the invention in a broad sense is an image classifier for receiving an input image and assigning the input image to one of a plurality of image classes by comparing the input image to a training set of training images. The image classifier includes a plurality of class distribution maps. Each of these maps is based on a plurality of features evaluated on training images, and each map represents those feature values that occur at least once in the training set for training images belonging to the corresponding class.

The image classifier further includes means for constructing a test map by evaluating the plurality of features on the input image, and means for comparing the test map to the class distribution maps in order to identify which one of the class distribution maps has the least distance to the test map.

Significantly, at least one of the features is defined according to a rule that relates to the shapes of images of at least one image class.

BRIEF DESCRIPTION OF THE DRAWINGS

FIG. 3 is an illustrative class distribution map.

FIG. 4 shows an illustrative computation of a distance from a test map to the class distribution map of FIG. 3.

DETAILED DESCRIPTION OF A PREFERRED EMBODIMENT

Figure 1:
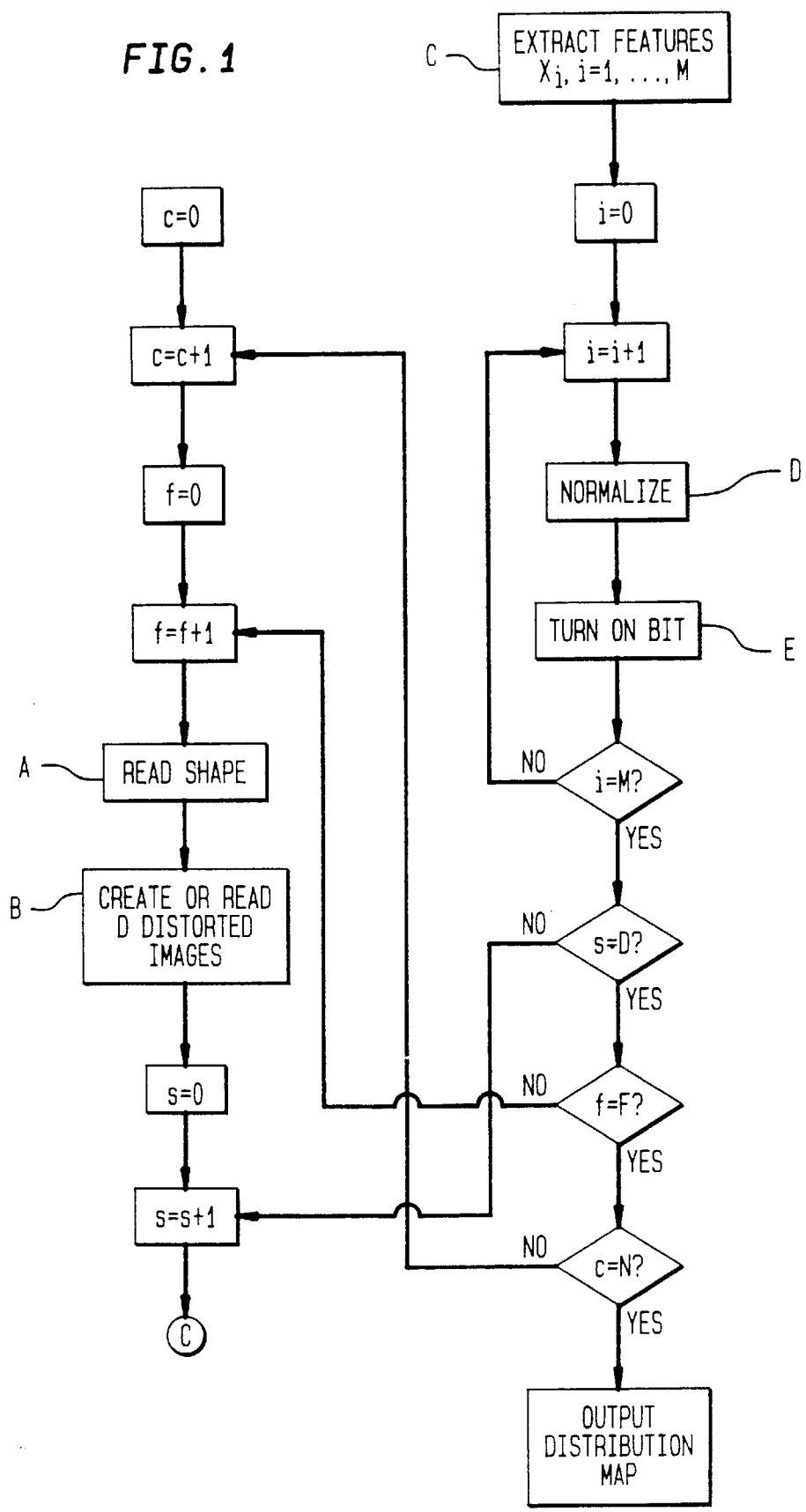
FIG. 1 is a flowchart of an illustrative training process useful in connection with the invention.

We have found it desirable to enrich or generate training sets by pseudo-random simulation of realistic models of image defects. For example, H. S. Baird, "Document Image Defect Models," in H. S. Baird et al., Eds., *Structured Document Image Analysis*, Springer-Verlag (1992), describes a parameterized model of image defects. The model specifies a distribution on parameters governing a distortion algorithm, operating on high-quality prototype images, that approximates the physics of printing and image acquisition. By pseudo-random sampling from the distribution, training and testing sets of unbounded size can be generated. Thus, there are no limits, other than those imposed by our computing environment, on the size of the training sets. And, since the training and test sets are both selected at random from the same distribution, the training set is representative by construction.

There is great freedom in the selection of appropriate metric features. However, we have found that many features that are well-known in the field of optical character recognition (OCR) will perform well in a perfect metrics approach such as the inventive method. (Typical features are low-order polynomial functions of the image pixel values.) Moreover, we have found that algorithms for automatically constructing features can be effective for finding small sets of features that will support highly accurate classifications.

As noted, some discrimination is afforded by features as simple as randomly chosen pairs of pixels (see Bledsoe, cited above). However, we have found that accuracy is much improved if at least one of the features is defined according to a rule that relates to the shapes of images of at least one image class. That is, a highly effective feature will generally be one that is selected, a prior, because it is known to offer some discrimination between at least one pair of image classes (as represented, e.g., in the training set). By way of illustration, features may be selected from a list of known features according to their performance on the training set. Alternatively, features may be constructed with reference to the training set. (One illustrative method for constructing features is described below.)

Thus, features may be specified manually at the outset, or constructed automatically during examination of the training set, or a combination of these. In any case, some number M of features will ultimately be chosen. We require that the range of each feature consists of at most V distinct values.

We represent every image, whether in the training set or in the test set (to be classified), as a vector of the M feature values.

We construct a distribution map for each class. In preferred distribution maps, each value of each feature is represented by a bit which is set to one if and only if that feature's value occurs in the training data for that class. Each class distribution map contains M*N bits.

During recognition, an input image is illustratively classified as follows:

a) compute the vector of feature values for the input image;

b) compute a non-negative integer distance to each class, by adding 1 to the class-distance for each feature whose input value does not occur in the distribution map of that class;

c) assign to the input image the class for which this distance is minimum;

d) optionally reject, or mark 'ambiguous,' images for which there is a tie among one or more distances;

e) optionally reject, or mark 'ambiguous,' images for which the gap between the minimum distance and the next smallest is less than a given threshold; and f) optionally reject images for which the minimum distance exceeds a given threshold.

By way of example, the training process illustrated in the flowchart of FIG. 1 takes, as input, outline descriptions of character shape for a predetermined number F of different fonts, and N symbols (each corresponding to a distinct class) represented in each of the F fonts. The input also includes a set of parameter values specifying a predetermined defect model. The output of the process is a distribution map. In addition to F and N, numerical constants include the number M of numerical features, the maximum integer value V of the (normalized) features, and the number D of distorted samples to be generated for each symbol-font pair.

For each symbol in each font, the outline shape description is read (Step A) and D distorted sample images are generated according to the predetermined defect model (Step B). For each of these distorted images, M numerical features are extracted (Step C), the value of each of these features is normalized to a value v lying within the range 1-V (Step D), and the corresponding bit is set to logical 1 in the distribution map (Step E).

Figure 2:
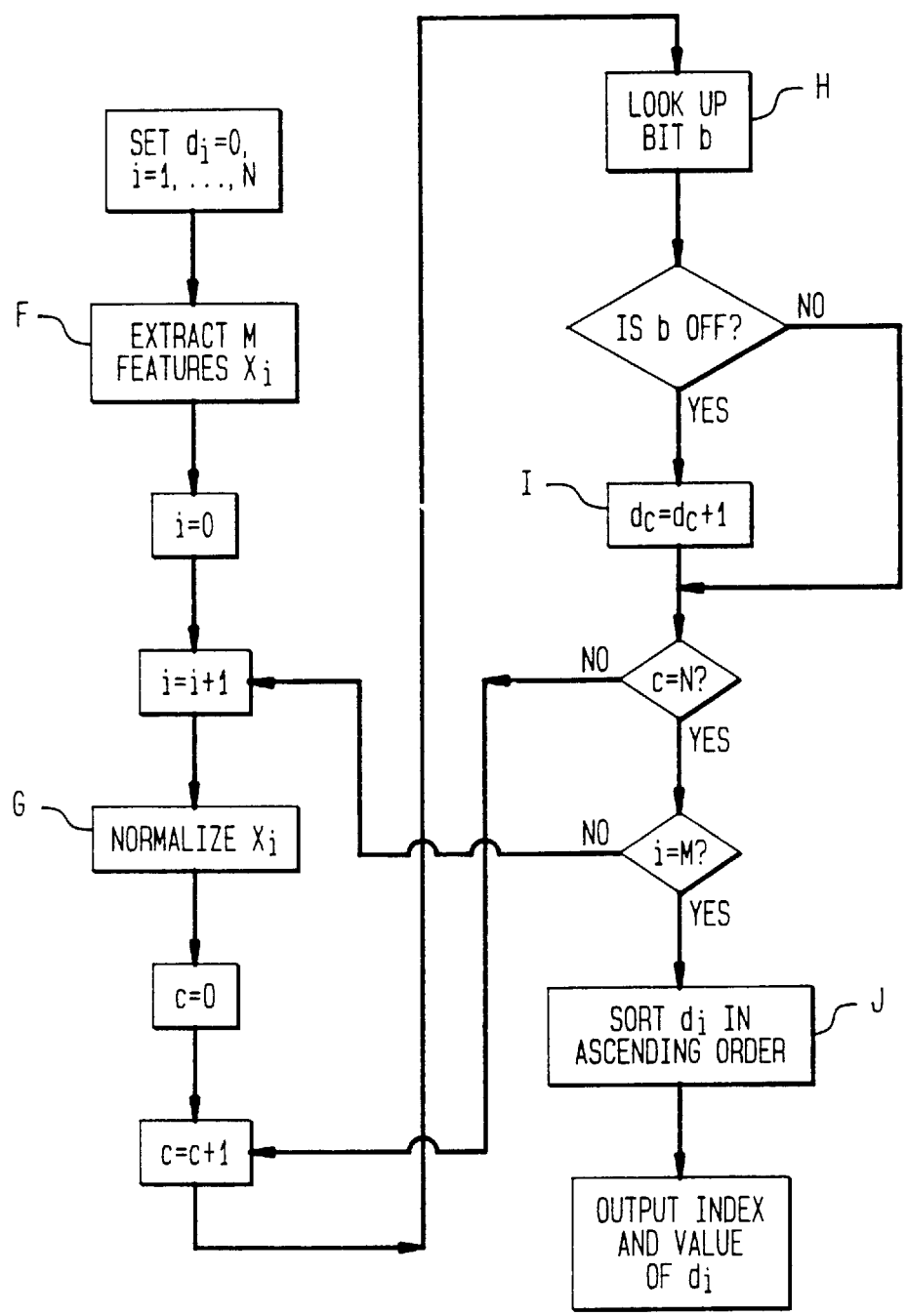
FIG. 2 is a flowchart of an illustrative testing process according to the invention.

Also by way of example, the testing process illustrated in the flowchart of FIG. 2 takes, as input, a distribution map and an image of unknown class. The output of this process is a list of pairs of the form (class index, distance), sorted in ascending order of distance.

M numerical features are extracted from the input image (Step F). Each feature is normalized as described above (Step G), leading to a normalized feature value v. For each feature, the bit b in the input distribution map that corresponds to the current class-feature-value combination is consulted (Step H). If this bit is OFF, the element of the distance array corresponding to the current class is incremented by 1 (Step I). After the elements of the distance array have all been evaluated, they are sorted in ascending order (Step J). This sorted array leads directly to the output of the testing process.

The testing process is further illustrated with reference to FIGS. 3 and 4. The features extracted from a test image have the values listed in row 10 of FIG. 4. A "0" is entered in row 20 of the same figure for each feature value that also occurs in the corresponding column of the class distribution map of FIG. 3. A "1" is entered for each feature value that does not occur in the corresponding column of the class distribution map. For the class represented by the map of FIG. 3, the corresponding element of the distance array is evaluated by summing the entries in row 20 of FIG. 4.

It is desirable to have training data of high quality; that is, data that are truly representative and of more than adequate size. For this reason, the smallest training set should contain at least k*V samples/class, where k is an integer greater than 1. Preferably, k is at least 10, because training sets substantially smaller than 10*V samples per class may fail to include feature values having significant rates of incidence.

If the training set has been selected randomly from a close approximation to the true defect distribution, then this minimum-size criterion helps assure that each feature value that can occur in the true distribution will, with high probability, also occur in the training set.

It should be noted that in the illustrative recognition process, each feature can contribute a 0 or 1 to the final "distance" computed by each class metric. That is, each feature contributes the same penalty for a failure to match, even though the range of some features (the number of distinct feature values) may be larger than others.

The choice of V may be critical for success. If V is small (exemplarily, less than 5), then we believe that features are unlikely to discriminate well. If V is large (exemplarily, greater than 500), then the distribution maps are undesirably large and the quantity of training data required is excessive. Thus, a preferred range for V is 5–500. We refer to such a range as "moderately coarse quantization" of the feature values.

It should be noted in this regard that the number of features need not be fixed in advance. Instead, it can grow during training in response to the statistics of the training set.

Constructing Features for Perfect Metrics

Figure 5:
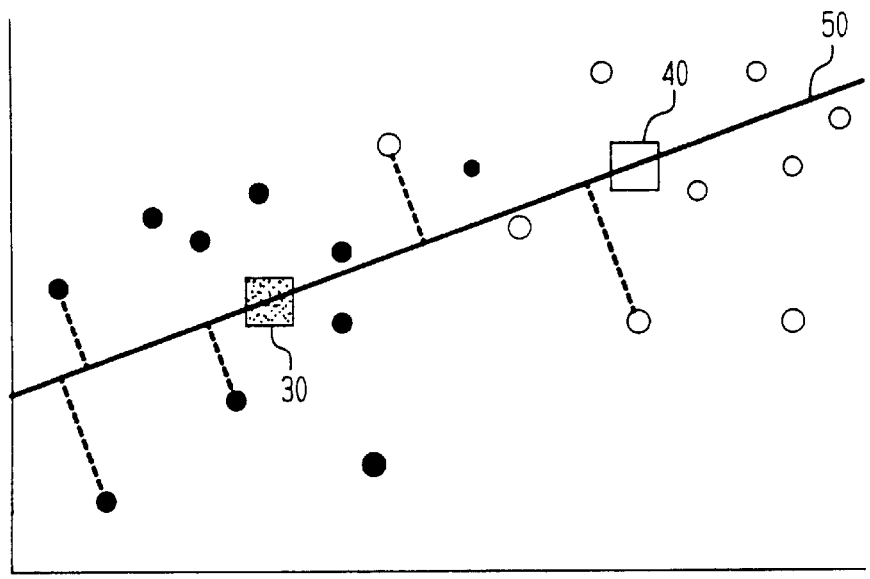
FIGS. 5 and 6 illustrate one possible procedure for constructing a new feature from, e.g., an input representation of a training image. For simplicity, the space represented by FIG. 5 has only two dimensions.
Figure 6:
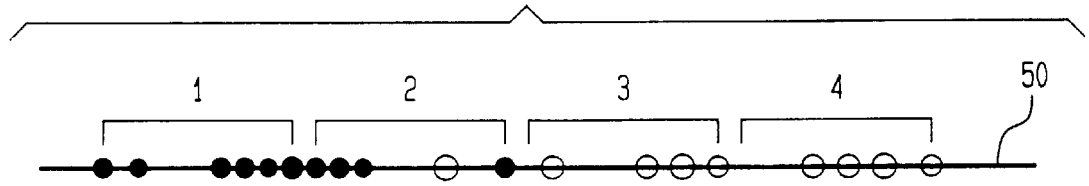

Described below, with reference to FIGS. 5 and 6, is a procedure for selecting features from a specified family of functions. This procedure is guaranteed to achieve maximum discrimination. The procedure progressively eliminates ambiguities in the training set by adding new features. It is guaranteed to terminate when all classes are discriminated or only intrinsic ambiguities remain.

The procedure iterates on each class c in turn. At each iteration, all training samples are separated into two groups $S_1$ and $S_2$, where $S_1$ contains images of class c (represented in the figure by black dots), and $S_2$ contains images of all other classes (represented in the figure by white dots). The sample mean 30, 40 of each group is calculated. A line 50 is drawn passing through the sample means. All samples are then projected onto this line. (Several exemplary projections are shown as broken lines in FIG. 5.) The range of projection is then divided evenly into a fixed number of segments, as shown in FIG. 6. A segment is marked "on" for a class if the projection of any sample of that class lies on that segment. The line 50 is considered as a "feature" (in the sense previously described) and the indices to the segments are the values that this feature can take. The marked segments form a distribution map for this feature. If there is no segment marked for both $S_1$ and $S_2$, then we have obtained a discriminating feature for all the images in $S_1$, and the procedure terminates (for class c). Otherwise, $S_1$ is pruned and only those samples overlapping with $S_2$ are retained. (For example, Segment 2 of FIG. 6 is marked for both $S_1$ and $S_2$.) The procedure is then repeated using the pruned $S_1$ and all the images in $S_2$. In the case that all samples in $S_1$ overlap with those from $S_2$, then $S_1$ is split into two halves and the procedure is applied to each half. This continues until either $S_1$ is empty, or it is impossible to separate $S_1$ and $S_2$ by any projection (e.g. when all the images in both $S_1$ and $S_2$ are identical).

EXAMPLE

We have built a classifier for the four most commonly used fonts in printed Chinese: Song, Fang Song, Hei, and Kai. The text size ranged from 7 point to 14 point, at a spatial sampling rate of 400 pixels/inch. The experiments embraced all 3,755 character classes of the GuoBiao Coding GB2312-80, Level 1 (See *Code of Chinese Graphic Character for Information Interchange, Primary Set* (GB2312-80), National Standards Bureau, Beijing, China (1980)). We chose some features commonly used in published Chinese recognition systems (See S. Mori et al., "Research on Machine Recognition of Handprinted Characters," *IEEE Trans. on Pattern Analysis and Machine Intelligence* PAMI-6, 4, (July 1984) 386–405.) The binary image of an input character was first size-normalized to 48×48 binary-valued pixel matrix by simple scaling and centering. That is, each image was mapped to a point in a binary-valued vector space of 48×48=2,304 dimensions, containing at most $2^{2304} \approx 10^{694}$ distinct points.

We used three integer-valued feature sets: vertical and horizontal projection profiles, distances from outer contours to the bounding box, and distributions of stroke directions.

The projection features were computed as follows. The image area was divided into upper and lower halves, and a vertical projection profile (counting the number of black pixels in each column) was computed for each. Similarly, two horizontal projection profiles were obtained for the left and right halves. These four profiles were then concatenated to form a vector with 48×4=192 dimensions; each projection feature's integer value lay in the range [0,24].

The contour features were distances from each of the four edges of the bounding box to the character's outer contour. For each column, we calculated the distance from the upper edge of the box to the first black pixel of the column, and from the lower edge to the last black pixel. Similarly for each row, we calculated the distance from the left edge to the leftmost black pixel, and from the right edge to the rightmost black pixel. These distances formed a vector of 48×4=192 dimensions; each contour feature's integer value lay in the range [0,48].

The stroke-direction features were computed by run-length analysis as follows. From each black pixel, we computed the length of the black runs containing that pixel as they were extended in four directions (horizontal, NE-SW diagonal, vertical, and NW-SE diagonal). The pixel was then labeled with the direction in which the run length was the maximum. Then we partitioned the image area into 16 (12×12) square regions and counted the number of pixels of each of the four types in each region. These counts were stored in a vector of 16×4=64 dimensions; each stroke direction feature's integer value lay in the range [0,144].

Each character image was thus mapped to a point in an integer-valued vector space of 192+192+64=448 dimensions, containing at most $25^{192} \times 49^{192} \times 145^{64} \approx 10^{731}$ distinct points.

We compressed the integer-valued ranges of both the contour and the stroke-direction features to lie in [0,24], matching the range of the projection features. We generated training sets with 800 samples per class, so that for each feature, we had 32 times as many samples as we had feature values.

To generate the distorted samples, we used an explicit, quantitative, parameterized model of defects due to printing, optics, and digitization, and a pseudo-random image generator to implement the model. The model parameters specified the nominal text size of the output (in units of points), the output spatial sampling rate (digitizing resolution in pixels/inch), the point spread function (the standard error of its Gaussian blurring kernel in units of output pixels), the digitizing threshold (in units of intensity, where 0.0 represents white and 1.0 black), the distribution of sensitivity among the pixel sensors (a noise term added to the threshold), the distribution of jitter among the pixels (i.e., discrepancies of the sensor centers from an ideal square grid, in units of output pixel), rotation (skew angle), stretching factors (both horizontally and vertically), and translation offsets with respect to the pixel grid.

Nominal text sizes of the training set data were 7, 9, 11, and 13 point, and for the test set 8, 10, 12, and 14 point. The pseudo-random generator accepted a specification of a distribution of these parameters; each parameter was randomized independently. The distributions used in these experiments were as follows. The digitizing resolution was fixed at 400 pixels/inch. The standard error of the Gaussian blurring kernel varied, from image to image, normally with mean 0.7 and standard error 0.3 (output pixels). The binarization threshold varied, from image to image, normally with mean 0.25 and standard error 0.04 (intensity). Pixel sensor sensitivity varied, from pixel to pixel, normally with mean 0.125 and standard error 0.04 (intensity). Jitter varied, from pixel to pixel, normally with mean 0.2 and standard error 0.1 (output pixels). Skew varied, from image to image, normally with mean 0 and standard error 0.7 degrees. The multiplicative factor affecting width varied uniformly in the interval [0.85, 1.15], and the multiplicative factor affecting height varied normally with mean 1.0 and standard error 0.02. Translation offsets were chosen uniformly in [0, 1], in units of output pixel.

Fifty samples were generated for each font/size/symbol triple, for a total training/testing set of 200 for each font/symbol pair and so 800 total for each symbol.

Figure 7:
FIG. 7 is an illustrative distribution map for a single sample representing a printed Chinese character.

The feature extractors were applied to each training sample. We can consider the result as either an integer-valued vector of 448 dimensions, or equivalently, as a binary-valued vector of 448×25=11,200 dimensions, referred to herein as a "distribution map." In a distribution map for a single sample, each feature is represented by 25 bits, and for a single sample a single bit is set to 1 indicating the value of the feature. Such a distribution map is illustrated in FIG. 7.

Figure 8:
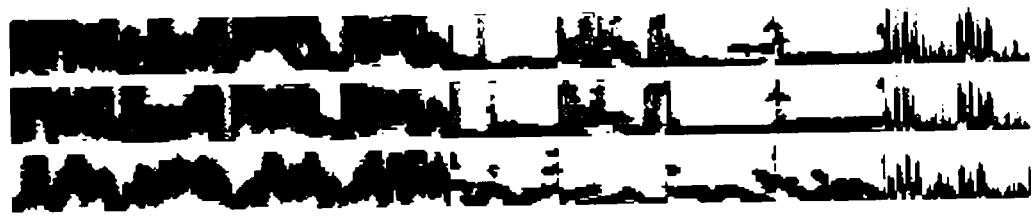
FIG. 8 is a group of three distribution maps for respective classes of Chinese characters.

For each class, the distribution maps for 800 training samples were combined into one map by computing their Boolean union. In such a class distribution map, each feature value that occurs at least once in the training set is represented by a bit set to 1, and 0-valued bits represent feature values that never occur. We chose to combine the training data for all four fonts into a single set of class distribution maps. The distribution maps of the first three classes used in our experiments are shown in FIG. 8. The classifier is completely described by the set of all 3,755 distribution maps, for a total of 3,755×11,200≈42.1 Mbits, or 5.26 Mbytes, of storage.

During testing, we extracted the features of each character image and, for each class, matched the features to the class distribution map. This was done by computing a 448-bit vector in which the bit corresponding to each feature bit was set to 1 if and only if the value of that feature occurred in the class distribution map. Finally, the "distance" of that class was taken to be the Hamming distance of this vector to an ideal vector containing all 1's.

We evaluated the performance of the classifier for the 3,755 classes in full GB2312-80 Level 1. The classifier was trained on 800 samples of each of the 3,755 classes, and tested on another 800 samples of each class. A total of 800×3,755=3,004,000 samples were tested. Table 1 summarizes the classification results. Table 2 shows the number of errors and correct rates in neighborhoods of various sizes about the optimal choice. (That is, there is a "correct" count if the correct class is anywhere within the given neighborhood.)

TABLE 1

|  | number of samples | number of errors | % correct |
|---|---|---|---|
| point size |  |  |  |
| 8 | 751,000 | 14,650 | 98.05 |
| 10 | 751,000 | 4,464 | 99.41 |
| 12 | 751,000 | 5,347 | 99.29 |
| 14 | 751,000 | 4,692 | 99.38 |
| font |  |  |  |
| Song | 751,000 | 7,707 | 98.97 |
| Fang Song | 751,000 | 5,116 | 99.32 |
| Hei | 751,000 | 11,136 | 98.52 |
| Kai | 751,000 | 5,194 | 99.31 |
| Total | 3,004,000 | 29,153 | 99.03 |

TABLE 2

| | N: size of neighborhood | | | | | | | | | |
|---|---|---|---|---|---|---|---|---|---|---|
| | 1 | 2 | 3 | 4 | 5 | 6 | 7 | 8 | 9 | 10 |
| number of errors | 29,153 | 6,919 | 4,419 | 3,423 | 2,819 | 2,411 | 2.103 | 1,873 | 1,728 | 1,566 |
| correct rate (%) | 99.03 | 99.77 | 99.85 | 99.89 | 99.91 | 99.92 | 99.93 | 99.94 | 99.94 | 99.95 |

We claim:

1. A method of character recognition, comprising the steps of:

receiving an input image that is to be assigned to one of a plurality of image classes;

extracting a respective numerical value of each of plural features of the input image, wherein at least one of said features is defined according to a rule that relates to the shapes of images of at least one said image class;

recording the input-image feature values;

providing a tabulation of those feature values that occur in a training set, wherein: (i) said training set comprises, for each image class, a plurality of training images that are known to belong to that class; and (ii) said tabulation associates each tabulated feature value with a corresponding class;

comparing the input-image feature values to at least some of the tabulated training-image feature values; and based on a result of said comparing step, assigning the input image to one of the image classes;

CHARACTERIZED IN THAT the step of providing a tabulation comprises providing a respective class distribution map for each image class;

each said class distribution map contains, for each of the plural features, a record of each numerical value of said feature that was exhibited by at least one training image of the pertinent class;

the comparing step comprises evaluating a respective class distance between each of the class distribution maps and a test map that tabulates the respective input-image feature values;

in the assigning step, the input image is assigned to that class having the least distant class distribution map as determined in the comparing step;

each class distance is evaluated by counting non-matched features;

a feature is counted as non-matched if and only if the numerical value of said feature as evaluated on the input image fails to match any of the numerical values of said feature tabulated in the pertinent class distribution map; and in the counting of non-matched features, every feature is given equal weight.

* * * * *